(12) United States Patent
Khamene et al.

(10) Patent No.: US 7,787,683 B2
(45) Date of Patent: Aug. 31, 2010

(54) TREE STRUCTURE BASED 2D TO 3D REGISTRATION

(75) Inventors: Ali Khamene, Princeton, NJ (US); Charles Florin, Princeton, NJ (US); Frank Sauer, Princeton, NJ (US); James P. Williams, Princeton Junction, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1292 days.

(21) Appl. No.: 11/303,564

(22) Filed: Dec. 16, 2005

(65) Prior Publication Data

US 2006/0188139 A1  Aug. 24, 2006

Related U.S. Application Data

(60) Provisional application No. 60/637,645, filed on Dec. 20, 2004.

(51) Int. Cl.
*G06K 9/00* (2006.01)
(52) U.S. Cl. ...................... 382/130; 382/154
(58) Field of Classification Search .................. 382/130
See application file for complete search history.

(56) References Cited

U.S. PATENT DOCUMENTS

| | | | |
|---|---|---|---|
| 5,396,890 A * | 3/1995 | Weng | 600/443 |
| 6,711,433 B1 * | 3/2004 | Geiger et al. | 600/431 |
| 6,842,638 B1 * | 1/2005 | Suri et al. | 600/425 |
| 7,191,110 B1 * | 3/2007 | Charbel et al. | 703/11 |
| 2003/0103682 A1 * | 6/2003 | Blake et al. | 382/282 |
| 2007/0019846 A1 * | 1/2007 | Bullitt et al. | 382/128 |
| 2007/0116342 A1 * | 5/2007 | Zarkh et al. | 382/130 |

OTHER PUBLICATIONS

Image segmentation by shape particle filtering de Bruijne, M.; Nielsen, M.; Pattern Recognition, 2004. ICPR 2004. Proceedings of the 17th International Conference on vol. 3, Aug. 23-26, 2004 pp. 722-725 vol. 3.*

* cited by examiner

*Primary Examiner*—Vu Le
*Assistant Examiner*—Michael Vanchy, Jr.

(57) ABSTRACT

A system and method for tree structure based two-dimensional to three-dimensional registration are provided for receiving three-dimensional (3D) data indicative of vessels, segmenting the 3D data with a vessel tree, simulating two-dimensional (2D) data responsive to the segmented 3D data to form a simulated 2D image, receiving 2D data indicative of vessels, segmenting the received 2D data with a vessel tree, finding a distance transform of the segmented 2D data to form a 2D distance map image, considering a set of poses as state vectors with the corresponding probability computed using the similarity measure computation, re-sampling the pose vector to find a set of most probable poses and considering them as hypothesized poses, recomputing the projection and re-evaluating the probability of the hypothesized poses and updating the state vector until the optimal pose is found.

30 Claims, 2 Drawing Sheets

TREE STRUCTURE BASED 2D TO 3D REGISTRATION

CROSS-REFERENCE TO RELATED APPLICATION

This application claims the benefit of U.S. Provisional Application Ser. No. 60/637,645, filed Dec. 20, 2004 and entitled "Tree Structure Based 2D-3D Registration", which is incorporated herein by reference in its entirety.

BACKGROUND

Two-dimensional (2D) to three-dimensional (3D) registration of a projection image to a volumetric data set typically involves three steps. First, a simulated projection image or digitally reconstructed radiograph (DRR) is computed given the current relative position of the projection source and the pre-operative volume. Second, a similarity measure and/or difference measure is computed for characterizing a metric to compare projection images to DRRs. Third, an optimization scheme searches through the parameter space, such as for six-dimensional rigid body motion, in order to maximize or minimize the similarity or difference measure. Once the optimum position is found, the DRR images are supposed to match the corresponding projection images.

2D to 3D registration is a well-researched topic. It is generally known to first to compute the DRRs from the volumetric image in a way that matches the real x-ray imaging results in terms of both brightness and contrast, and then to choose a well-behaved similarity or difference measure that can robustly characterize a comparison metric for the images (see L Zollei: "2D-3D Rigid-Body Registration of X-Ray Fluoroscopy and CT Images", Masters Thesis, MIT AI Lab, August 2001, hereinafter "Zollei"). Unfortunately, in order to make such an algorithm practical, the computational time has to be reduced.

State of the art implementations of such techniques suggest that for typical three-dimensional volume data sets, the computational time is on the order of a few minutes (see Zollei). Most of this time is spent on generating DRRs. The number of iterations over which these lengthy computations have to be done is also very important. In Zollei, the research suggests random sampling of the DRRs and performing computations based only on these random samples in order to decrease the computation load. The main goal is to reduce the computational complexity. However, this approach sacrifices robustness, since less information is available to the optimizer to take an accurate step toward the global solutions.

Aside from the intensity based registration method, there have been methods proposed in the literature that require a segmentation step. Feature-based registration methods have been heavily investigated for tissue images, and several such methods have been developed for vascular images. This class of methods includes surface-based methods (see A J Herline, J L Herring, J D Stefansic, W C Chapman, R L Galloway, B M Dawant, "Surface Registration for Use in Interactive, Image-Guided Liver Surgery", Computer Aided Surgery: 5(1), 2000, pp. 11-17), iterative closest point algorithms (see P J Besi, N D McKay, "A method for registration of 3-D shapes", IEEE Transactions on Pattern Analysis and Machine Intelligence: 14, 1992, pp. 239-56; see also Y Ge, C R Maurer Jr, J M Fitzpatrick, "Surface-based 3-D image registration using the Iterative Closest Point algorithm with a closest point transform", Medical Imaging 1996: Image Processing, Proceedings of SPIE, 1996), and landmark-based techniques (see I Dryden, K Mardia, *Statistical Shape Analysis*, John Wiley and Sons, New York, N.Y., 1998). This class also includes 2D to 3D registration methods that attempt to determine how to project vessel structure from a 3D image so as to best match the vessel structure in a 2D projection image of the same anatomy (see E Bullitt, A Liu, S R Aylward, and S M Pizer, "Reconstruction of the intracerebral vasculature from MRA and a pair of projection views", Information Processing in Medical Imaging, Pouitney, VT, 1997, pp. 537-542; see also E Bullitt, A Liu, S R Aylward, C Coffey, J Stone, S Mukherji, and S M Pizer "Registration of 3d cerebral vessels with 2d digital angiograms: Clinical evaluation", Academic Radiology: 6, 1999, pp. 539-546). A model-based method is also described (see Stephen R. Ayiward, Julien Jornier, Sue Weeks, Elizabeth Bullitt, "Registration and Analysis of Vascular Images", International Journal of Computer Vision, Volume 55, Issue 2-3 November-December 2003, Pages: 123-138, 2003).

For many practical applications, especially interventional scenarios, registration time is crucial. Performing registration in real-time or close to real-time is a highly desirable feature that enables such applications.

SUMMARY

These and other drawbacks and disadvantages of the prior art are addressed by an exemplary system and method for tree structure based two-dimensional to three-dimensional registration.

An exemplary system for tree structure based two-dimensional to three-dimensional registration includes a processor, a segmentation unit for segmenting 2D data and 3D data with respective vessel trees, and a distance transform module for computing distance maps of the segmented 2D data to form a 2D distance map image, a particle filtering based optimization technique to randomize, re-sampling, and test the validity (i.e., probability based on a similarity/distance measure computed using 2D distance image and projection of the 3D points from the segmented 3D data) of the hypothesized poses in order to register the received 2D data relative to the projection of the received 3D data. An exemplary method for tree structure based two-dimensional to three-dimensional registration includes receiving three-dimensional (3D) data indicative of vessels, segmenting the 3D data with a vessel tree, simulating two-dimensional (2D) image points through a projection given geometry of projection device and a pose responsive to the segmented 3D data to form a simulated 2D image, receiving 2D data indicative of vessels, segmenting the received 2D data with a vessel tree, finding the distance transform of the segmented 2D data to form a 2D distance map image, randomizing, testing and re-sampling the hypothesized poses of the 2D data relative to the projection of the received 3D data based on a similarity/distance measure, following the particle filter based optimization scheme.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method for tree structure based two-dimensional to three-dimensional registration in accordance with the following exemplary figures, in which.

DETAILED DESCRIPTION OF PREFERRED EMBODIMENTS

A system and method are provided for rigidly registering volumetric data to a set of projection images, such as those generated by an x-ray device or a linear accelerator, for example. In an interventional or radiation treatment scenario, it is desired to relate the intra-procedural images to the pre-procedural volumetric data, which might have been acquired days before a given operation.

Figure 1:
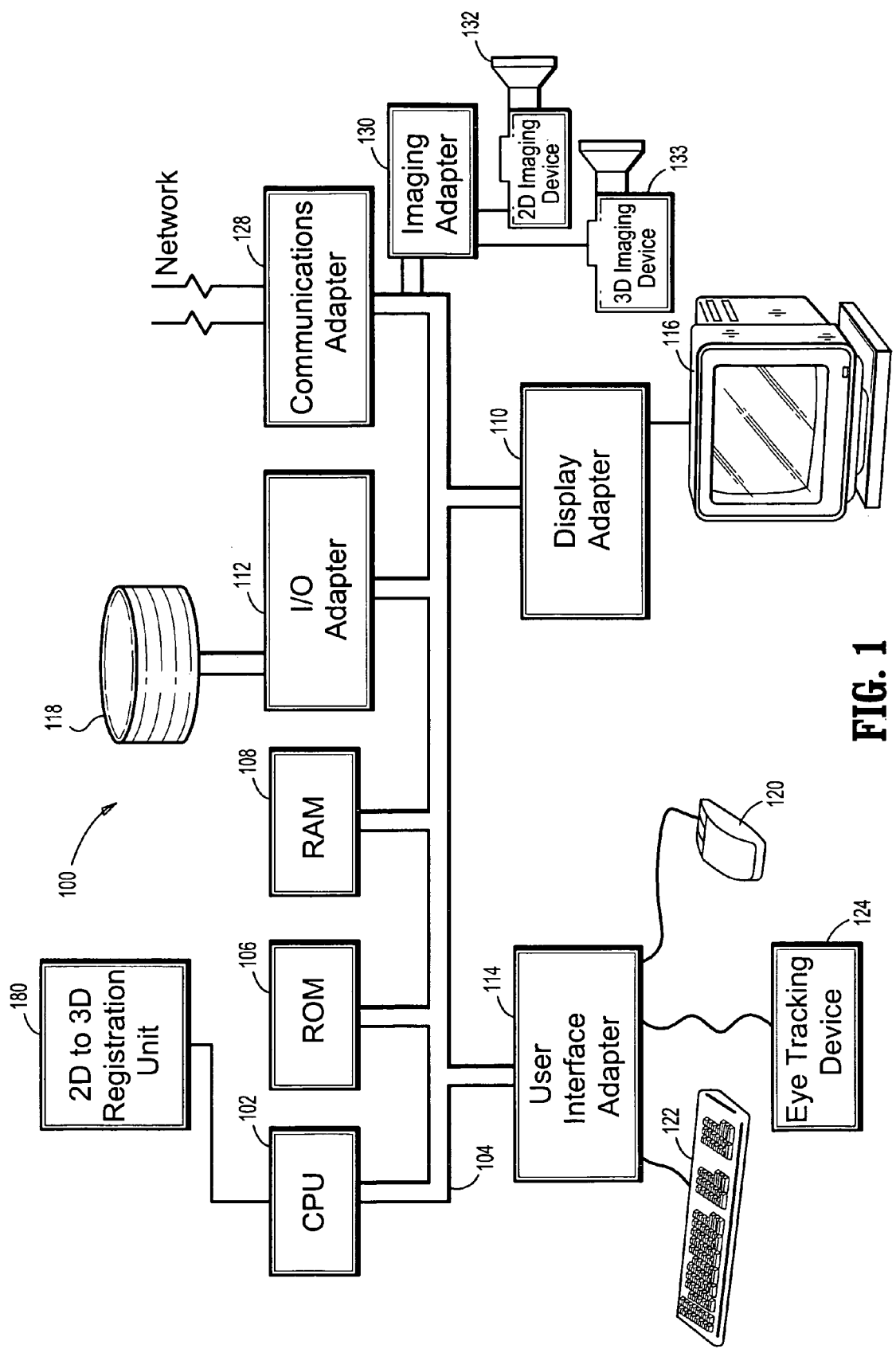
FIG. 1 shows a schematic diagram of a system for tree structure based two-dimensional to three-dimensional registration in accordance with an illustrative embodiment of the present disclosure.

As shown in FIG. 1, a system for tree structure based two-dimensional to three-dimensional registration, according to an illustrative embodiment of the present disclosure, is indicated generally by the reference numeral 100. The system 100 includes at least one processor or central processing unit (CPU) 102 in signal communication with a system bus 104. A read only memory (ROM) 106, a random access memory (RAM) 108, a display adapter 110, an I/O adapter 112, a user interface adapter 114, a communications adapter 128, and an imaging adapter 130 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114.

A two-dimensional (2D) imaging device 132 or external image storage device and a three-dimensional (3D) imaging device 133 or external image storage device are each in signal communication with the system bus 104 via the imaging adapter 130. A segmentation unit 170 and a distance unit 180 are also included in the system 100 and in signal communication with the CPU 102 and the system bus 104. While the 2D to 3D registration unit 180 is illustrated as coupled to the at least one processor or CPU 102, this component is preferably embodied in computer program code stored in at least one of the memories 106, 108 and 118, wherein the CPU 102 executes the computer program code.

Figure 2:
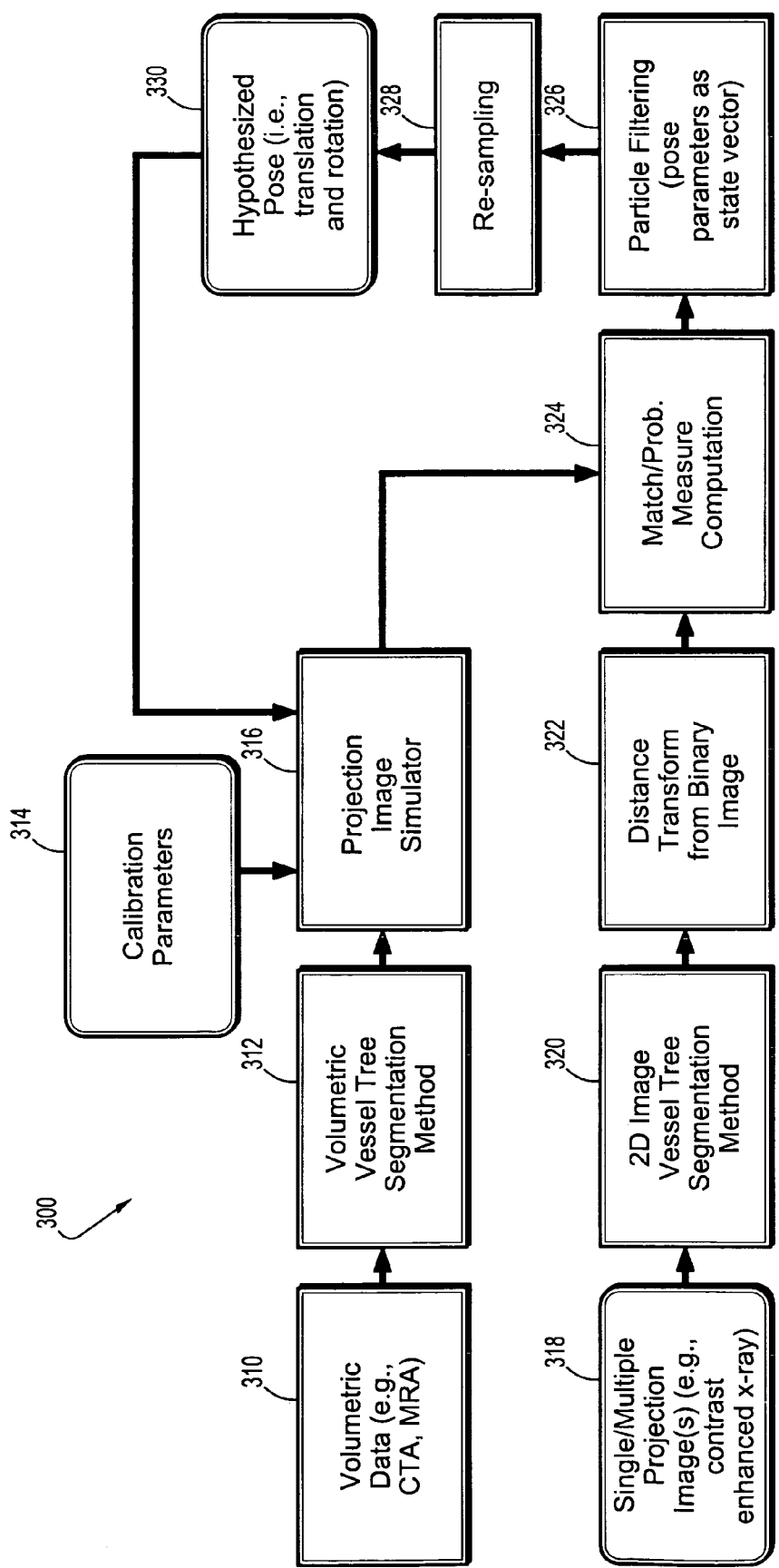
FIG. 2 shows a data and control flow diagram of a system and method for tree structure based two-dimensional to three-dimensional registration in accordance with an illustrative embodiment of the present disclosure.

Turning now to FIG. 2, control and data flow for tree structure based two-dimensional to three-dimensional registration is indicated generally by the reference numeral 300. Here, volumetric data 310, such as computed tomographic angiography (CTA) or magnetic resonance angiography (MRA), is acquired from a data storage device or the scanner and passed to a 3D or volumetric vessel tree segmentation block 312. The block 312 passes segmented 3D data to a projection image simulator 316, which also receives calibration parameters 314.

Projection image data 318 may be single or multiple images such as contrast and enhanced x-ray, for example, which is also retrieved from a data storage device or intra-operative scanning device. The projection image data 318 is passed to a 2D image vessel tree segmentation block 320, which, in turn, passes segmented 2D data to a transform block that extracts the distance map from the segmented binary image.

The 2D distance map image is passed to a computation block 324 that also receives the projection of the 3D data from the block 316. The computation block 324 estimates the similarity measure or matching criterion, which can be thought of as the probability of the pose using the projection of 3D data (i.e., from projection image simulation block 316) that was computed. The particle-filtering state vectors indicated by block 326 are a set of the most probable poses, which are the input of re-sampling block 328. The re-sampling block, in turn, re-samples the pose data, and passes re-sampled data as a hypothesized (randomized around the most probable) pose, such as translation and rotation for example. The hypothesized pose is fed back to the projection image simulator 316.

The presently disclosed method utilizes tree-like structures for both the volumetric and projection images. A well-defined image metric is established for evaluating the accuracy of registration for a given set of parameters. In addition, a particular particle-filtering scheme is used. This scheme is based on a Bayesian framework as the engine for performing a maximization or minimization of a similarity or metric quantifier. A similarity or metric measure is defined to quantify the distance between the synthetic projection image based on a hypothesized pose and the real segmented projection images.

The similarity or metric measure is computed based on the distance transform of the segmented structures in the projection images. The algorithm contains several building blocks, and is relatively simple to implement with low computational complexity. This algorithm has the potential to be used for real-time applications, where update for the pose has to be calculated at a high rate.

In an exemplary embodiment, a fast and automated method is provided for aligning images of tree structures, particularly images of a human vessel tree. While the general task of aligning images of tubes is difficult, the specific task of aligning vascular images introduces additional complications including vascular network changes and non-rigid deformations, such as changes in the number, size, and relative location of the vessels in the images. Yet vessels can still provide an excellent basis for registration.

Vessels are often well distributed throughout an organ and thereby capture misalignment within that organ. On the other hand, surfaces and landmarks, which are commonly used in other methods, may be poorly correlated with internal deformations. Additionally, compared to volumetric registration methods, the sparseness, multi-scale geometric properties and network configuration of the vessels may make vessel-based registration methods faster and more broadly applicable. This exemplary embodiment method for registration includes the following primary building blocks.

A volumetric segmentation block automatically segments the vascular structure from volumetric data sets, such as by using particle filters for segmentation of vascular structures with a Kalman-directed prior knowledge. A centerline of the segmentation is extracted and saved in a multi-element tree data structure format, such as a B-tree. This increases the performance of traverse operations. This process effectively reduces the amount of the volumetric data to a minimum required to accurately present the tree structure or vessel tree. An advantage here is that the amount of time spent to compute the synthesized projection images of the vessel tree is much smaller than the time it takes to compute the projection of the full 3D volume.

A projection segmentation block automatically segments the vascular structure from projection images based on the method of using particle filters for segmentation of vascular structures with a Kalman-directed prior knowledge. The same process as it is explained in the previous item can be applied here to extract the binary mask representing the segmentation.

A distance measurement block defines a well-behaved metric in order to quantify the closeness of a synthetically projected vessel tree image given the calibration parameters, such as those estimated off-line through a calibration process or available based on geometrical properties of the imaging devise provided by the manufacturer, and a hypothetical pose. The distance transform of the segmented projection image(s) in arbitrary dimensions is computed using a linear time algorithm. The multi-element tree array of the three dimensional segmented structure is traversed, the projected points are computed based on the assumed pose, the corresponding location in the distance transform is looked up and the distance values are accumulated. The final result is a geometrically correct distance measure between the two graphs (i.e., projected 3D graph and segmented 2D graph), and it is valid for large discrepancies between the two structures.

The particle filter framework is used on registration parameters, such as pose, as an optimizer to maximize or minimize the match or difference measure. A particle filter method is a sequential Monte-Carlo technique that can be used to estimate the Bayesian posterior density function with a set of samples. In the context of rigid registration, using a particle filter method, this embodiment estimates the probability density function (PDF) of pose parameters considered as the feature space (i.e., state vector). Each sample in the feature space is associated with the weight determining its impact on the PDF. Advantages of utilizing the particle filtering approach for registration include first to decrease the chance of converging to a local optimum for the pose and second to increase the capture range of the optimization process.

The optimization process can be explained as follows. First, the process starts with an initial particle distribution as the prior (pose parameters and the probability). This could be a Gaussian distribution of particle centered around a first guess for the pose. It should be noted that the width of the distribution here influences the capture range of the registration process as a whole. Second, these particles are considered as current state particles.

Third, some noise is added to the state particles to dislocate them randomly. The new weights associated with modified pose particles are computed using the method described previously (i.e., through computation of a similarity measure). It should be noted that weight computation here is quite fast and it is based on a distance transform that is only needed to be computed once at the beginning of the operation. These weights can serve as the probability of a particle's pose parameters being correct.

Fourth, the current state and the modified particles are then processed into a re-sampling step to normalize the weights. Re-sampling allows for greater accuracy in estimating the PDF. The overall effect of the re-sampling step is that particles with high relative weights contribute more to the PDF. Therefore, they increasingly affect the re-sampled particle, while low-weight particle presence in re-sampled particles decreases over time or iterations. Fifth, the process is resumed by returning to the second step.

Thus, a system and method for tree structure based two-dimensional to three-dimensional registration have been disclosed for receiving three-dimensional (3D) data indicative of vessels, segmenting the 3D data with a vessel tree, simulating two-dimensional (2D) data responsive to the segmented 3D data and a hypothetical pose to form a simulated 2D image, receiving 2D data indicative of vessels, segmenting the received 2D data with a vessel tree, finding the distance transform of the segmented 2D data to form a 2D distance map image, optimizing the pose based on a particle filtering scheme, assuming pose parameters as a state vector, randomly varying, accessing the probability using the similarity metric computed based on the distance transform and re-sampling in order to find an optimum pose maximizing the probability or similarity metric, which also registers the projection of the received 3D structure to the corresponding segmented 2D structure from the received 2D images. The simulated 2D image may be calculated or projected only from the segmented structures in the 3D volume at a frame rate greater than that of the projection of the full 3D volume.

The algorithm is preferably implemented as a software application or as a part of a software application on a programmable computer. The registration process outlined here can be applied for many applications, including patient localization and interventional procedures where projection images can be augmented with three-dimensional preoperative information. An advantage is the performance of very fast and robust localized registration based on vascular tree structures.

In alternate embodiments of the apparatus 100, some or all of the computer program code may be stored in registers located on the processor chip 102. In addition, various alternate configurations and implementations of the 2D to 3D vessel based registration unit 180 may be made, as well as of the other elements of the system 100.

It is to be understood that the teachings of the present disclosure may be implemented in various forms of hardware, software, firmware, special purpose processors, or combinations thereof. Most preferably, the teachings of the present disclosure are implemented as a combination of hardware and software.

Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units (CPU), a random access memory (RAM), and input/output (I/O) interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as additional imaging units, data storage units and/or printing units.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for tree structure based two-dimensional to three-dimensional registration comprising:
   receiving three-dimensional (3D) image data indicative of vessels;

segmenting the 3D image data with a vessel tree to generate a segmented 3D image;

simulating two-dimensional (2D) image from the segmented 3D image data and a hypothesized pose to form a simulated 2D image;

receiving 2D data indicative of vessels;

segmenting the received 2D image data with a vessel tree to generate a segmented 2D image;

extracting a 2D distance map image from a distance transform of the segmented 2D image;

comparing the simulated 2D image with the 2D distance map image to generate a probability of the hypothesized pose;

optimizing the hypothesized pose based on a particle filtering scheme that uses a plurality of poses of the received 2D image data relative to the received 3D image data and the probability; and registering the received 2D image data with the received 3D image data based on the optimized hypothesized pose, wherein weights of the particle filtering scheme are based on the distance transform of the segmented 2D data, and wherein the method is performed by a processor.

2. The method as defined in claim 1, further comprising calibrating an imaging system that generates the simulated 2D image prior to simulating the 2D image.

3. The method as defined in claim 1, wherein the received 3D image data is computed tomographic angiography data or magnetic resonance angiography data and the received 2D image data is contrast enhanced x-ray data.

4. The method as defined in claim 1, wherein the distance transform is applied to a binary image.

5. The method as defined in claim 1, wherein the probability is quantified by a similarity measure.

6. The method as defined in claim 1, wherein the particle filtering is performed on pose parameters comprising a state vector.

7. The method as defined in claim 1, wherein the hypothesized pose includes at least one of a translation or a rotation.

8. The method as defined in claim 1, wherein the received 3D image data comprises pre-procedural data and the received 2D image data comprises intra-procedural data.

9. The method as defined in claim 1, wherein the received 2D image data comprises at least one image.

10. The method as defined in claim 1, wherein the particle filtering is based on a Bayesian framework as an engine for performing a maximization or minimization of a similarity or metric quantifier.

11. The method as defined in claim 1, wherein the distance transform is used to define a similarity or metric measure to quantify a distance of a synthetic projection image that is responsive to the hypothesized pose corresponding to the segmented 2D image.

12. The method as defined in claim 1, wherein the distance transform is used to compute a similarity or metric measure responsive to segmented structures in the simulated 2D image.

13. The method as defined in claim 1, wherein the simulated 2D image is calculated or projected only from segmented structures in the 3D image data at a frame rate greater than that of the projection of the full 3D image data.

14. The method as defined in claim 1, wherein the vessel trees are indicative of a human vessel tree exhibiting vascular network changes and non-rigid deformations.

15. The method as defined in claim 1, wherein segmenting the 3D image data comprises:

segmenting a vascular structure by using particle filters for segmentation of vascular structures with a Kalman-directed prior knowledge; and extracting a centerline of the segmentation and saving it in a multi-element tree data structure format.

16. The method as defined in claim 1, wherein segmenting the 2D image data comprises:

segmenting the vascular structure from 2D images using particle filters for segmentation of vascular structures with a Kalman-directed prior knowledge; and extracting a binary mask indicative of the segmentation.

17. The method as defined in claim 1, wherein extracting the 2D distance map image comprises defining a metric that quantifies the closeness of a synthetically projected vessel tree image points given calibration parameters, wherein the calibration parameters are estimated off-line through a calibration process or are available based on geometrical properties of an imaging device.

18. The method as defined in claim 1, wherein the 2D distance map image is computed using a linear time algorithm.

19. The method as defined in claim 1, wherein the comparing comprises:

traversing a multi-element tree array of the segmented 3D image data; and computing projected points based on the hypothetical pose, where a corresponding location in the 2D distance map is looked up and distance values are accumulated to provide a geometrically correct distance measure that is valid for large discrepancies between the hypothetical pose and the 3D image data.

20. The method as defined in claim 1, wherein the particle filtering is used on registration parameters as an optimizer to maximize or minimize a similarity metric.

21. The method as defined in claim 1, wherein the particle filtering comprises a sequential Monte-Carlo technique that is used to estimate a Bayesian posterior density function with a set of samples, and includes estimating a probability density function (PDF) of pose parameters considered as feature space in the context of a rigid 2D to 3D registration.

22. A method for two-dimensional to three-dimensional registration, the method comprising:

receiving three-dimensional (3D) data indicative of vessels;

segmenting the 3D data with a vessel tree;

simulating two-dimensional (2D) data responsive to the segmented 3D data to form a simulated 2D image by the computer;

receiving 2D data indicative of vessels;

segmenting the received 2D data with a vessel tree;

finding a distance transform of the segmented 2D data to form a 2D distance map image;

using a similarity metric based on the distance map to compare the simulated 2D projection image with the segmented 2D image;

computing a probability based on the similarity metric, and re-sampling poses of the received 2D data relative to the received 3D data based on a particle filtering scheme to keep the most probable poses generating the highest similarity between the simulated 2D image and segmented 2D image; and finding the pose with the highest similarity for registering the received 2D data to the corresponding projection of the received 3D data, wherein the particle-filtering comprises:

using an initial particle distribution as a prior vector of pose parameters and probability and considering these particles as current state particles;

adding noise to the state particles to dislocate them randomly and computing new weights associated with the modified pose particles, where the weight computation is based on a similarity measure computed from the distance transform of the 2D segmented projection image that is only computed once at the beginning of the operation, the weights indicating the probability of a particle's pose parameters being accurate; and processing the current state and the modified particles into a re-sampling step to normalize the weights, while considering these particles as the new current state particles, wherein the method is performed by a processor.

23. A system for tree structure based two-dimensional to three-dimensional registration comprising:

a processor;

a segmentation software module for segmenting 2D data and 3D data with respective vessel trees; and a distance transform computation software module for computing a distance transform of the segmented 2D data to form a 2D distance map image;

a similarity measure computation software module to generate a similarity metric based on the 2D distance map image and a projection of the 3D data; and an optimization module, based on a particle filtering scheme with pose parameters as a state vector to hypothesize a set of poses, wherein the optimization module is configured to re-sample poses of the pose parameters based on the similarity metric to find an optimal pose that registers the received 2D data relative to the projection of the 3D data, wherein weights of the particle filtering scheme are based on the distance transform of the segmented 2D data.

24. The system as defined in claim 23, further comprising at least one of an imaging adapter and a communications adapter in signal communication with the processor for receiving 3D image data before receiving 2D image data.

25. A program storage device readable by machine, tangibly embodying a program of instructions executable by the machine to perform program steps for tree structure based two-dimensional to three-dimensional registration, the program steps comprising:

receiving three-dimensional (3D) data indicative of vessels;

segmenting the 3D data with a vessel tree;

simulating two-dimensional (2D) data responsive to the segmented 3D data to form a simulated 2D image;

receiving 2D data indicative of vessels;

segmenting the received 2D data with a vessel tree;

finding a distance transform of the segmented 2D data to form a 2D distance map image;

computing a similarity measure based on the simulated 2D image and the 2D distance map image;

optimizing pose parameters based on a particle filtering scheme using the pose parameters as state vectors and by evaluating a probability based the similarity measure, and re-sampling the state vectors to register the simulated 2D image with the segmented 2D data, wherein weights of the particle filtering scheme are based on the distance transform of the segmented 2D data.

26. The program storage device as defined in claim 25 wherein the optimizing and re-sampling is done until convergence.

27. The program storage device as defined in claim 26, wherein the convergence is defined by setting a threshold on an acceptable amount of variation in the pose parameters computed from a probability density function (PDF) of the state vectors.

28. The program storage device as defined in claim 27, wherein the threshold for convergence of translation parameters is less than one millimeter, and the threshold for convergence of rotation parameters is less than one degree.

29. The program storage device as defined in claim 27, wherein the PDF of the most probable poses indicates an uncertainty associated with the registration process.

30. The program storage device as defined in claim 27, wherein the threshold for convergence of translation parameters is less than five millimeters, and the threshold for convergence of rotation parameters is less than two degrees.

* * * * *